United States Patent [19]

Iwamatsu et al.

[11] Patent Number: 5,610,675
[45] Date of Patent: Mar. 11, 1997

[54] APPARATUS FOR INSERTING DATE INFORMATION IN CAMERA FILM

[75] Inventors: Yoshiyuki Iwamatsu; Shinichi Endo, both of Yotsukaido, Japan

[73] Assignee: Seiko Precision Inc., Japan

[21] Appl. No.: 653,757

[22] Filed: May 23, 1996

[30] Foreign Application Priority Data

May 24, 1995 [JP] Japan .................................. 7-125260

[51] Int. Cl.$^6$ .................................................. G03B 17/24
[52] U.S. Cl. ........................... 396/315; 396/319; 396/310
[58] Field of Search ..................................... 354/105, 106

[56] References Cited

U.S. PATENT DOCUMENTS

| | | | |
|---|---|---|---|
| 5,376,981 | 12/1994 | Itoh | 354/106 |
| 5,453,805 | 9/1995 | Itoh | 354/106 |
| 5,479,228 | 12/1995 | Tamamura et al. | 354/106 |

*Primary Examiner*—Safet Metjahic
*Assistant Examiner*—Nicholas J. Tuccillo
*Attorney, Agent, or Firm*—Adams & Wilks

[57] ABSTRACT

An apparatus for inserting date information into given positions within the frames of film loaded in a camera. If it is impossible to modify the date, or if the user finds that the date is erroneous, the apparatus permits photographs with correct date to be printed. The apparatus has a CPU including a first RAM for storing the present date information. When frames of the film are used for photography, date information is inserted into the given positions, using a date information inserting LED array. When the present date information is modified by operating date switches, the difference between unmodified date information and modified date information is calculated and stored in a second RAM. The number of frames is also stored. When the film is rewound, the aforementioned difference and the number of frames are read out and inserted in the leader of the film. When the film used for photography in this way is printed, the date information, the difference, and the number of frames are checked. With respect to frames having frame numbers preceding the frame having a frame number equal to the above-described number of frames, i.e., frames used for photography before modification of the date information, the above-described difference is added to the date information. As a result, the frames can be printed with correct date information.

3 Claims, 6 Drawing Sheets

F I G. 2
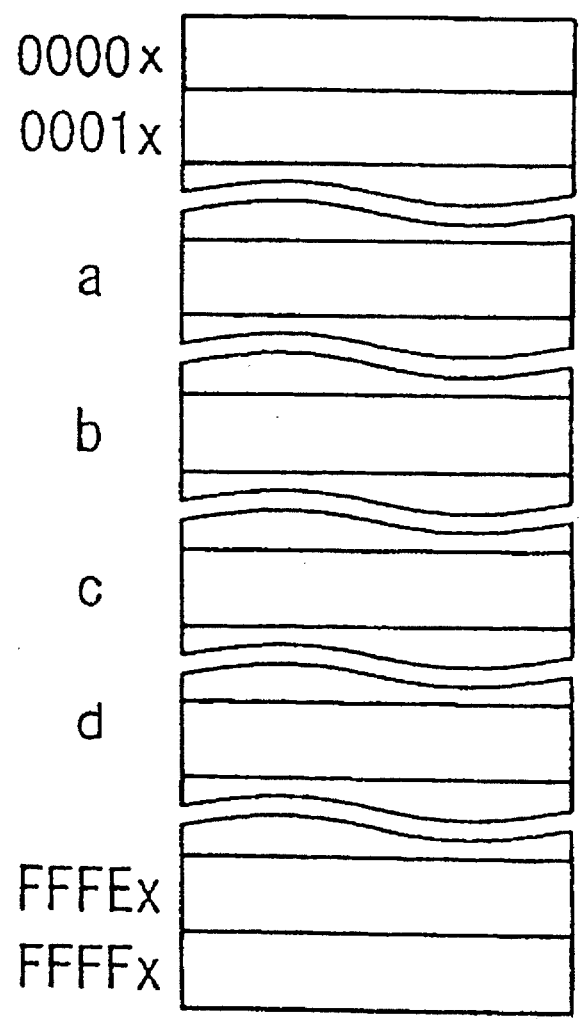

APPARATUS FOR INSERTING DATE INFORMATION IN CAMERA FILM

FIELD OF THE INVENTION

The present invention relates to an apparatus for inserting date information in film loaded in a camera.

BACKGROUND OF THE INVENTION

In recent years, most compact cameras have had a function of inserting date and time (hereinafter simply referred to as the date information) in the film. This function of inserting the date information is quite convenient, since the date information is automatically superimposed on the image. However, if an unskilled user finds that the superimposed date information is incorrect during a journey or the like, it is difficult for the user to modify the date information without reference to an instruction manual for the camera.

Furthermore, if the date information is out of order, the user may take several shots until the user discovers that fact.

SUMMARY OF THE INVENTION

It is an object of the present invention to provide a camera which has a function of inserting date information in the loaded film and which permits photographs having correct dates to be printed, even if the date information cannot be amended correctly, or if the user takes shots without noticing that the date information is out of order.

A date information insertion apparatus according to the present invention is an apparatus for optically or magnetically inserting date information into given positions located outside the exposure regions of film loaded in a camera. This date information insertion apparatus comprises a date information modifying means for making a modification to the date information, a first storage means for storing unmodified date information, a second storage means for storing modified date information obtained by making a modification to the unmodified date information, a third storage means for storing the difference between the date information stored in the first storage means and the date information stored in the second storage means, a fourth storage means for storing an information indicative of the number of frames used for photography before the modification to the date information, and a date information insertion means for inserting the information stored in the third and fourth storage means into other given positions located outside the exposure regions of the film.

Another embodiment of the invention is a date information insertion apparatus for optically or magnetically inserting date information into given positions located outside the exposure regions of film loaded in a camera, and comprises a date information modifying means for making a modification to the date information, a first storage means for storing unmodified date information, a second storage means for storing modified date information obtained by making a modification to the unmodified date information, a third storage means for storing the difference between the information stored in the first storage means and the information stored in the second storage means, and a date information insertion means. Where the date information is not modified, the date information insertion means inserts only the aforementioned unmodified date information into the given positions within each film frame. Where the date information is modified, the information stored in the third storage means is inserted into the given positions, in addition to the unmodified date information.

A further embodiment of the invention is a date information inserting apparatus for optically or magnetically inserting date information into given positions located outside the exposure regions of film loaded in a camera, and comprises a date information modifying means for modifying the date information, a first storage means for storing date information of each frames of the film when respect frames are used for photography, a second storage means for storing modified date information, a third storage means for storing the difference between the information stored in the first storage means and the information stored in the second storage means, an arithmetic means for adding the difference stored in the third storage means to the date information stored in the first storage means, and a date information insertion means for inserting date information stored in the first storage means into the given positions within each film frame.

In the present invention, unmodified date information, modified date information, and information indicative of the number of film frames used before a modification to the date information are inserted into the given positions located outside the film exposure regions. The correct date about each film frame can be calculated from these kinds of information and printed on the photographs.

Other objects and features of the invention will appear in the course of the description thereof, which follows.

BRIEF DESCRIPTION OF THE DRAWINGS

FIG. 2 is a diagram illustrating the contents of a RAM 10b included in the first and second examples of the invention;

DETAILED DESCRIPTION OF THE INVENTION

Figure 1:
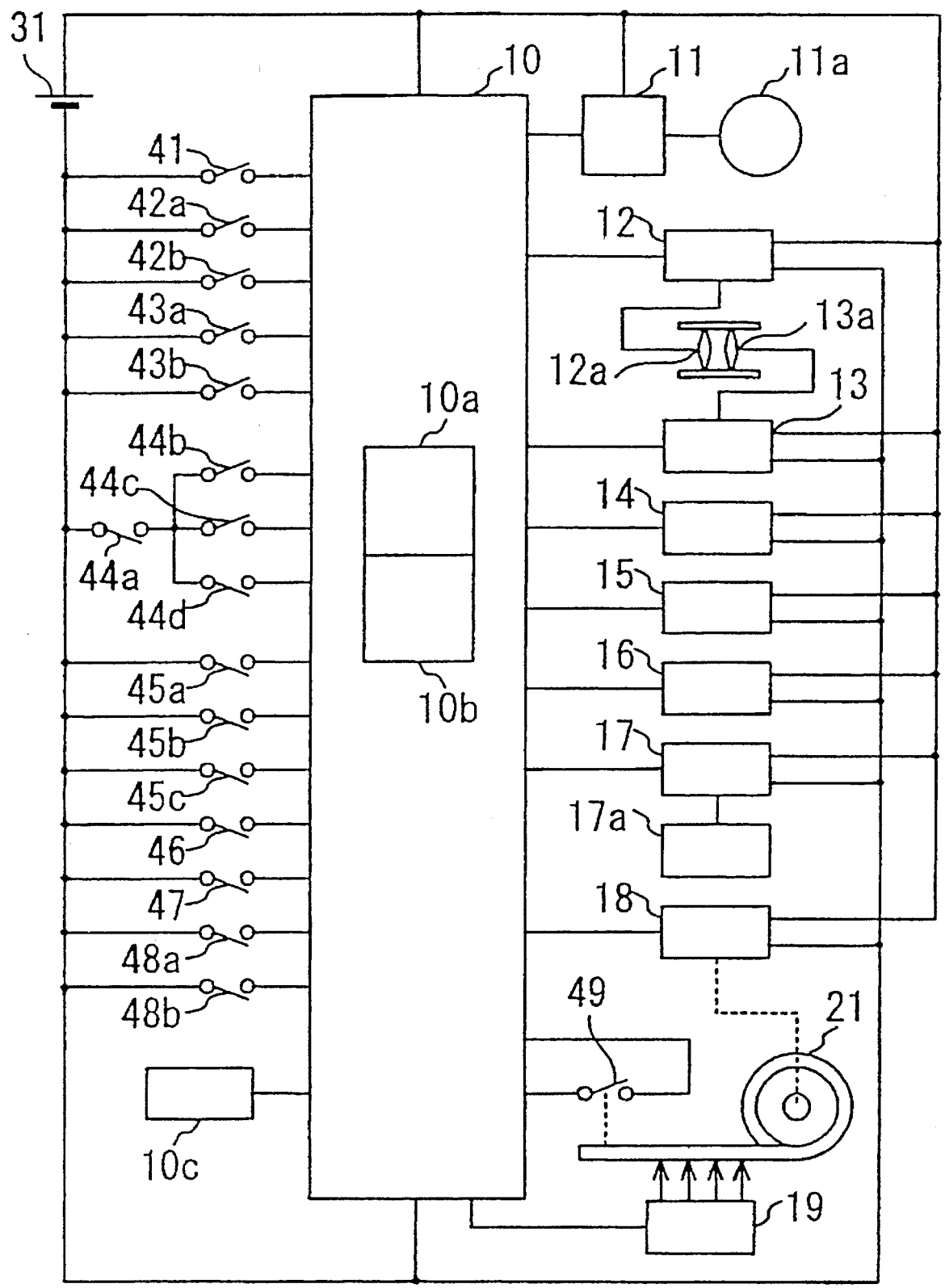
FIG. 1 is a block diagram of an apparatus for inserting date information in camera film according to the present invention.

Referring to FIG. 1, there is shown a camera including an apparatus for inserting date information in camera film according to the present invention. This apparatus has a microcomputer (hereinafter referred to as CPU) 10 which controls the operation of the whole camera. The CPU 10 includes a read-only memory (ROM) 10a for permanently storing programs and data and a random access memory (RAM) 10b used for calculations of data and for temporal storage of data. An external nonvolatile memory 10c, such as an electrically erasable programmable read-only memory (EEPROM), is connected to the CPU. The CPU 10 can read, erase, or write data according to commands.

In the RAM 10b, kinds and contents of data have been previously addressed. The internal structure of the RAM 10b is shown in FIG. 2. Stored at address a is the ever newest date information. Stored at address b is information obtained before a date information modification operation (described later) is performed. Stored at address c is the difference between the date information occurring before the data modification operation is performed and the date information occurring after the data modification operation is performed. Stored at address d is the number of a frame of film 21 which is used just before the data modification operation is carried out. The date information consists of five pieces of information: year, month, day, hour, and minute.

A shutter driver circuit 11 drives a shutter 11a under instructions of the CPU 10, for performing an exposure operation. A variable frame lens driver circuit 12 drives a variable frame lens 12a. A focusing lens driver circuit 13 drives a focusing lens 13a.

A photometer circuit 14 measures the brightness of a photographic subject under instructions of the CPU 10 and sends the results to the CPU 10. A range finder circuit 15 measures the distance to the photographic subject under instructions from the CPU 10 and sends the results to the CPU 10.

A timer 16 measures the present time in minutes, produces an output signal to the CPU 10 every minute, and produces an interrupt signal.

A display panel driver circuit 17 drives a display panel 17a under instructions of the CPU 10.

A film feeder driving circuit 18 is controlled by the CPU 10. When a forward rotation occurs, the film feeder driving circuit 18 rotates the film 21 in the direction to take it up. When a reverse rotation occurs, the film feeder driving circuit 18 drives the film 21 in the direction to rewind it. The amount of the forward or reverse rotation is detected by a feed detection switch 49 consisting of an optical interrupter, reflector, or the like. The feed speed of the film 21 is detected. A winding operation for winding the film to the next frame precisely is performed under instructions of the CPU 10.

A date information inserting LED array 19 consists of a plurality of LEDs. When the film 21 is being fed, the CPU 10 selectively puts on or out LEDs representing characters to designate the date information to be inserted, according to the feed speed detected by the feed detection switch 49. Thus, the date information is recorded in given positions on the film face.

A main switch 41 is a push switch for enabling operation of the camera, and is designed to be toggled. Whenever the switch is pushed, the camera is enabled or disabled.

A zoom wide drive switch 42a and a zoom telephoto drive switch 42b are push switches. When the zoom telephoto drive switch 42b is pushed, the CPU 10 causes the variable frame lens driver circuit 12 to drive the variable frame lens 12a in such a direction that the lens approximates a telephoto lens. When the zoom wide drive switch 42a is pushed, the CPU 10 causes the variable frame lens driver circuit 12 to drive the variable frame lens 12a in such a direction that the lens approximates a wide-angle lens. For each of the switches 42a and 42b, the switch drives the variable frame lens 12a while the switch is being pushed. When the switch is released, it brings the variable frame lens 12a to a stop. As the variable frame lens 12a moves, the magnification provided by a zoom lens changes.

A partial pushdown switch 43a is closed when a release button is partially pushed down. A full pushdown switch 43b is closed when the release button is fully pushed down. The full pushdown switch 43b produces a release signal.

Film sensitivity-reading switches 44a–44d read a coded pattern printed on the cartridge (not shown) of the film 21.

The CPU 10 calculates the number of frames of the film 21 and the film sensitivity Sv from the read code pattern.

Zoom encoders 45a–45c detect a code pattern printed on the zoom mount (not shown). When the variable frame lens 12a moves, the states of the zoom encoders 45a–45c are switched in a stepwise fashion. The CPU 10 reads the code pattern on the zoom encoders 45a–45c and converts the pattern into an exposure value Av according to the table stored in the ROM 10a. A mode switch 46 is used to set the camera in various modes of operation.

A rear cover switch 47 senses whether a cartridge of the film has been loaded or not and whether the rear cover of the camera is open or closed. When the photographer loads the cartridge of the film 21 into the camera and closes the rear cover of the camera, the rear cover switch 47 is closed. When the film 21 is taken up or rewound, a feed detection switch 49 detects perforations of the film 21 in the moving film and produces a signal in the form of pulses. If the cartridge is loaded in the camera and the rear cover of the camera is closed, the rear cover switch 47 is opened. When this is detected, the CPU 10 actuates the film feeder driving circuit 18 to take up the film 21. When a given number of pulses is applied to the feed detection switch 49, a Braking instruction is produced to the film feeder driving circuit 18, thus ending the feeding of the film 21.

The date information can be set to initial values or modified by operating date switches 48a and 48b.

After a scene or object is photographed, a Takeup instruction is supplied to the film feeder driving circuit 18. When the number of the pulses applied to the feed detection switch 49 reaches a given number corresponding to one frame, a Braking instruction is delivered. In this way, the film is taken up by an amount corresponding to one frame.

A battery 31 is connected with all of the CPU 10, the photometer circuit 14, the range finder circuit 15, the variable frame lens driver circuit 12, the film feeder driving circuit 18, and the shutter driver circuit 11 so that electric power is supplied to these circuits and component.

The operation of the apparatus constructed described thus far is now described. When the battery is placed in position, the CPU 10 sets the date information stored at the address a to initial values and inhibits insertion of the date information. At this time, a character array displayed on the display panel 17a is "OFF". Under this condition, the photographer sets the date information to a desired initial value, using the date switch 48a and the date modification switch 48b. Then, the CPU 10 writes date information at the address a. At the same time, the CPU permits insertion of the date information. The photographer can select one insertion from several choices such as "year, month, day" and "day, hour, minute".

Subsequently, the CPU 10 activates the timer 16 and adds 1 minute to the contents at the address a according to the interrupt signal produced every minute. The present time is retained and displayed on the display panel 17a.

When the cartridge is loaded, the CPU 10 controls the film feeder driving circuit 18 while checking the output signal from the feed detection switch 49. The film 21 is fed to the location of the first frame. At this time, the CPU 10 reads the number of frames capable of being used for photography, from the cartridge. At the same time, the CPU clears the contents at the addresses of the RAM 10b which are associated with modification of the date information. If the main switch is operated when the lens mount is located at the photography-inhibited position, the lens mount is moved into the position where photography is permitted, thus enabling operation of the release switch.

The date information is modified in the manner described below. If the date switch 48a is released within 3 seconds since it has been depressed, the displayed date information is changed. Whenever the date switch 48a is depressed, the displayed information is cyclically changed as follows: "OFF"→"year, month, day"→. . . →"day, hour, minute"→ "OFF"→. . . .

If the date switch 48a is kept depressed for more than 3 seconds, the apparatus enters a date modification mode. At this time, the CPU 10 copies the contents of the address a into the address b. The date switch 48a acts as a switch for selecting a potion of date information to be modified. The date modification switch 48b modifies the date information. For example, the CPU 10 flickers the leftmost numeral of the date display portion of the display panel 17a to inform the user that the date can be modified. Where "year, month, day" are being displayed, the leftmost numeral represents the "year". Where "day, hour, minute" are being displayed, the leftmost numeral represents the "day". If the date modification switch 48b is depressed once, the value of the flickering numeral is increased by one. When the displayed numeral reaches the maximum number, the displayed numeral is returned to its initial value. If the displayed numeral is a year, the maximum number is 99, and the initial value is 0. If the displayed numeral is a month, the maximum number is 12, and the initial value is 1. If the displayed numeral is a day, the maximum number is 28 to 31, depending on the month, and the initial value is 1. If the displayed numeral is an hour, the maximum number is 24, and the initial value is 0. If the displayed numeral is a minute, the maximum number is 60, and the initial value is 0. If the date switch 48a is again depressed, the flickering displayed numeral is shifted to the immediately right position. If the final, herein that is the rightmost, numeral of the displayed digit array "year→month→day" or "day→hour→ minute" is flickering, and if the date switch 48a is depressed, the numeral is stopped from flickering. Thus, the date modification is complete. At this time, the CPU 10 writes date information obtained when the date modification is complete into the address a. The CPU writes the difference between the date information at the address a and the date information at the address b into the address c. The CPU writes the present number of frames into the address d.

Figure 3:
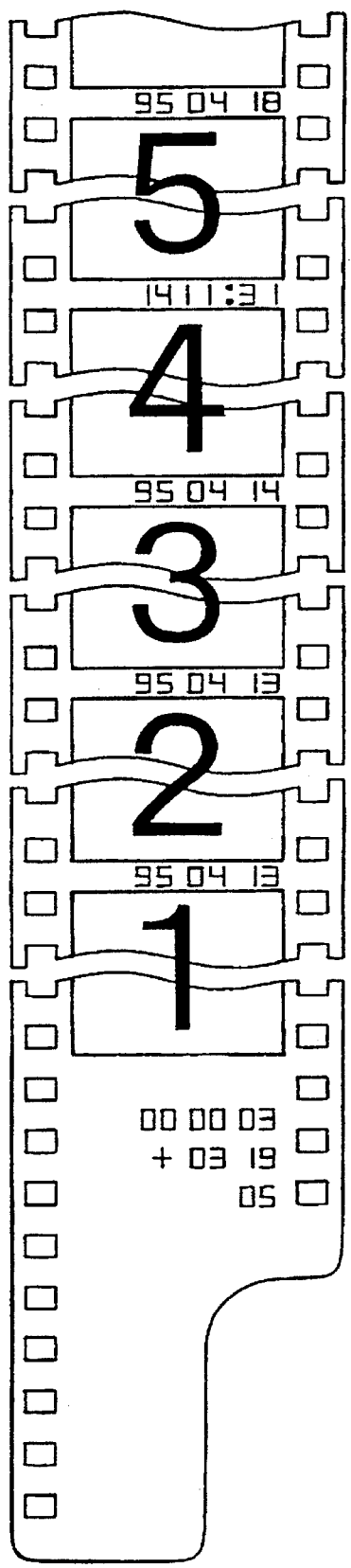
FIG. 3 is a front elevation showing parts of film in which date information has been inserted according to the first example of the invention.

When the photographer takes one shot, i.e., uses one film frame, a date insertion operation is carried out. When the film is taken up, the CPU 10 measures the feed speed of the film 21 from the output from the feed detection switch 49. Correspondingly, the date information at the address a is inserted between this frame and the next frame. This is illustrated in FIG. 3. The large Gothic characters indicate the numbers assigned to the frames. In FIG. 3, inserted in the first frame is the "year, month, and day" portions of the date information, i.e., "95 04 13". The same date information is inserted in the second frame. The third frame was used for photography on the next day and so "95 04 14" has been inserted. In the fourth frame, the date information was changed to information about "day, hour, and minute" and, therefore, "14 11:31" was inserted. At this time, the photographer found that the date was erroneous and added 3 days, 3 hours, and 15 minutes. The information was modified to "95 4/17 14:46". In the fifth frame, the displayed information was returned to "year, month, day". On the next day, a photograph was taken. Therefore, the inserted information is "95 04 18". During this series of operations, when a modification was made after the photography using the fourth frame, data representing 3 days, 3 hours, and 15 minutes was stored at the address c. The number assigned to the frame initially used for photography after the modification of the date information was stored at the address d.

When the film is rewound, the information about the difference stored at the address c and the information about the number of frames stored at the address d is read out and copied into positions different from the positions of the frames where the date information has been already inserted. In the example of FIG. 3, date information has been inserted in the leader of the film 21. In particular, the inserted data consists of a character array "00 00 03+03 19" indicating the information about the date information stored at the address c and a character array "05" representing the number given to the frame first appearing after the modification. The symbol "+" indicates that information about the difference is added to the flames appearing prior to the number of frames inserted in this leader as a result of this modification. The whole information is printed. As a consequence, information about the correct date information is printed in every frame.

This printing operation will not be described in detail below. As an example of the printing operation, date information, the difference between the two kinds of date information, and the numbers given to the flames are read by a reading means (not shown). The difference between the two kinds of date information is added to the date information in the frames appearing prior to the frame being shown as the inserted number by a processing means (not shown). New date information is automatically inserted in the corresponding frames by an insertion means (not shown) when the flames are printed. Of course, the printing operation may also be carried out manually.

Figure 4:
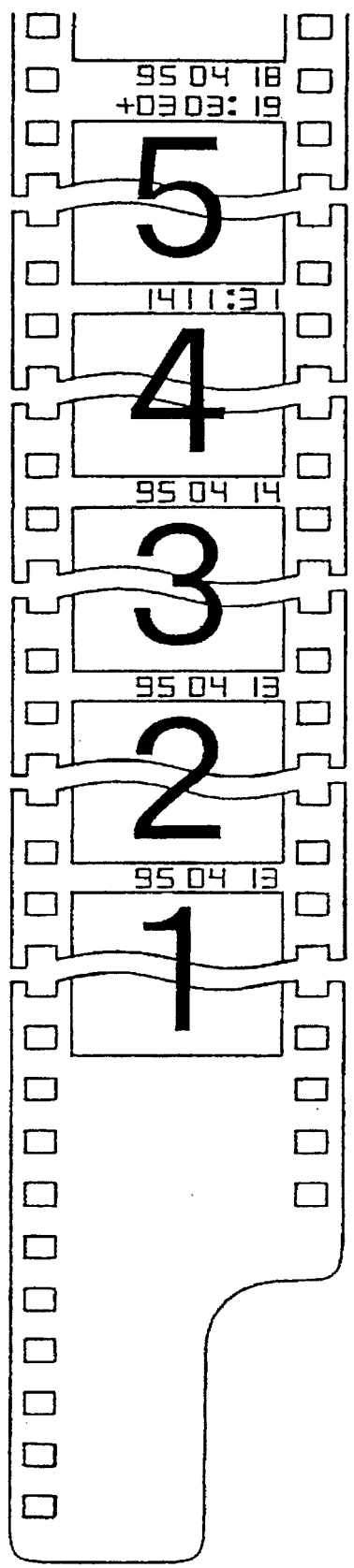
FIG. 4 is a front elevation showing parts of film in which date information has been inserted according to the second example of the invention.

Referring next to FIG. 4, there is shown another example of insertion made according to the present invention. The processing is similar to the processing of the first-mentioned example up to the photography operation. When the photographer takes one shot, a date insertion operation is performed. When the film is taken up, the CPU 10 measures the feed speed of the film 21 from the output signal from the feed detection switch 49. The CPU then inserts the date information at the address a into the space between this frame and the next frame. The contents, or the difference, of the address c, are inserted near the space.

In FIG. 4, the large Gothic numerals indicate the numbers given to the frames. Information inserted in the first frame is "95 04 13" which is the "year, month, and day" parts of the date information. The same information is inserted in the second frame. Since the third frame was used for photography on the next day, "95 04 14" has been inserted. In the fourth frame, the information was changed to information about "day, hour, and minute" and so the printed information is "14 11:31". At this time, the photographer noticed that the date was erroneous and added "3 days, 3 hours, 15 minutes". As a result, the information was modified to "95 4/17 14:46". In the modification made after the photography using the fourth frame, data representing the "3 days, 3 hours, 15 minutes" is stored at the address c. Therefore, this data is written immediately after photography using the fifth frame. That is, in the fifth frame, the displayed information was returned to "year, month, day" and a photograph was taken on the next day. Consequently, inserted characters are "95 04 18" and "+03 03:15" which is information about the difference.

During printing, the spaces between the successive frames of the film 21 are all checked automatically or manually as described above. If the difference between the two kinds of date information (stored at the address c) is inserted in any space, the difference is added to the frames used earlier for photography. Then, the frames are printed. As a result, correct date information can be printed concerning every frame. This makes it unnecessary to use the leader of the film. Consequently, the number of frames in the film can be saved. Also, any accident due to exposure of the leader can be prevented.

In the two examples described above, the addresses c and d exist in plural sets. That is, if they are composed of character arrays of the difference related the numbers of the frames, modification of the date information can be made plural times on one film.

Figure 5:
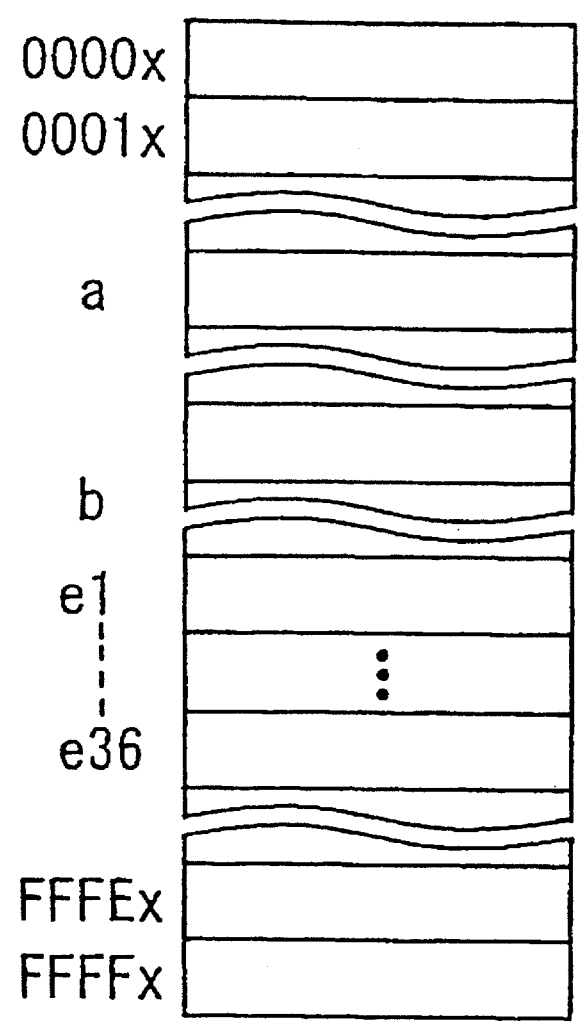
FIG. 5 is a diagram illustrating the contents of a RAM 10b included in the third example of the invention.
Figure 6:
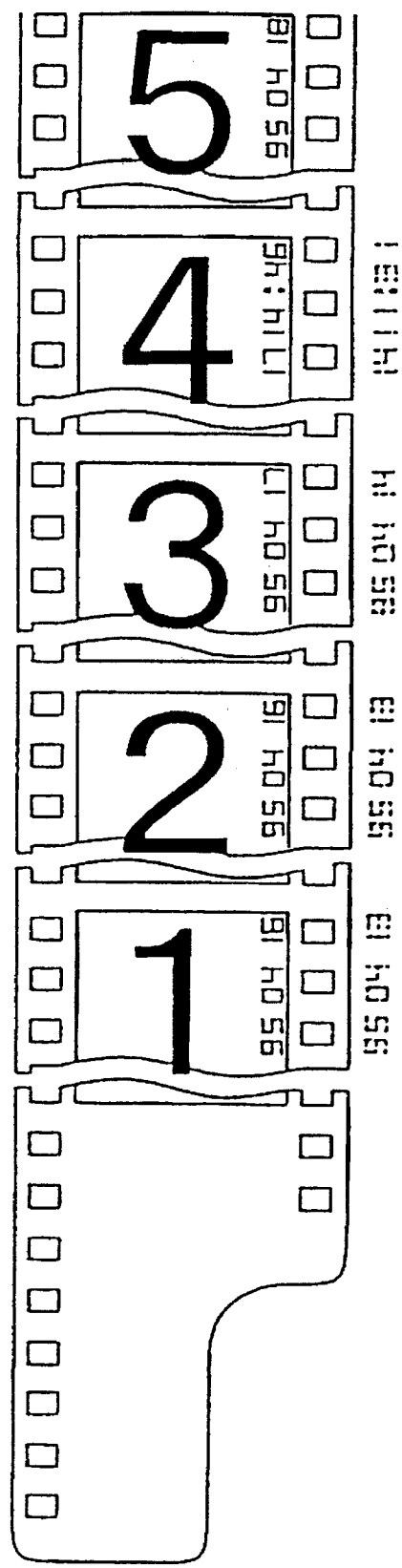
FIG. 6 is a front elevation of parts showing film in which date information has been inserted according to the third example of the invention.

Referring next to FIG. 6, there is shown a further example of the present invention. In this example, date information is not inserted whenever one frame is used. Rather, during rewinding of the film after use of all the frames of the film 21, the date information is inserted. The EEPROM 10c has regions indicated by addresses e1–e36, as shown in FIG. 5. These regions can store date information about each individual frame.

On completion of modification of the date information, the contents of those of the addresses e1–e36 which correspond to frames prior to the present frame are changed to modified, correct date information. It has been previously determined that date information about the first frame is written at the address e1 of the RAM 10b. Date information about the second frame is written at the address e2, and so on. Date information latched on completion of a shutter operation is not inserted when the film is taken up to the next frame. Rather, the information is written at the addresses e1–e36 of the RAM 10b. The CPU 10 reads information from the addresses e1–e36 immediately prior to rewinding of the film. During the rewinding, the feed speed of the film 21 is measured by the feed detection switch 49, and the date information is inserted in the corresponding frame according to the feed speed.

In FIG. 6, the large Gothic numerals indicate numbers given to frames. The numerals indicated by the solid lines within the frame represent date information obtained after a modification. The numerals located outside the frame and indicated by the broken lines represent information obtained prior to the modification, and indicate the contents of the addresses prior to the modification of the date information. With respect to the first frame, "95 04 13" which are the "year, month, day" parts of the date information are stored at the address e1. With respect to the second frame, the same information is stored. With respect to the third frame, "95 04 14" is stored at the address e3, because the frame was used for photography on the next day. Information inserted in the fourth frame is "14 11:31", because the information was switched to information about "day, hour, minute". At this time, the photographer found that the date was erroneous and added "3 days, 3 hours, and 15 minutes" so that the date was modified to "95 4/17 14:46". At this time, the CPU 10 modified all the information at the addresses e1–e4 for the frames used for previous photography. With respect to the fifth frame, the displayed information was returned to "year, month, day", and the frame was used for photography on the next day. Therefore, "95 04 18" is stored at the address e5. During rewinding of the film 21, the date information stored at these addresses is inserted into the film 21. As a result, date information as indicated by the solid lines is inserted into the frames.

The examples described in connection with FIGS. 4 and 6 have the advantage that correct date information can be inserted, irrespective of how many times a date modification is repeated, until a film is used up for photography. Furthermore, what is inserted is not limited to date information. Other array of characters may be added later.

In the examples described in connection with FIGS. 1 and 4, one set of addresses c and d is used. In the example described previously in conjunction with FIG. 6, two or more sets of addresses c and d may be prepared. Correct date information may be found by calculations and inserted during rewinding rather than when a date modification operation is performed. This can reduce the number of writing operations into the EEPROM 10c. Hence, the life of the EEPROM 10c can be prolonged.

In every example of the present invention, a selector switch for making effective or invalidating any date modification operation may be provided. The user can determine whether the date information is modified or not when an insertion is made.

Furthermore, a date information insertion means different from the date information insertion means used when the film is taken up to the next frame may be used. The information may be inserted into portions other than those used for photography, such as unexposed frames and the leader of the film, using another date information insertion means or the same date information insertion means as mentioned above.

In the previous examples of the present invention, the date information inserting LED array 19 is used to insert date information. In the case of film having a magnetic track, a magnetic head for magnetically writing data may be employed. In this case, a magnetic signal is modulated according to the speed of the fed film and according to a predetermined format, thus recording date information.

In the present invention, unmodified date information, the difference between the unmodified date information and modified date information, the information indicative of the number of frames used before the modification, and other kinds of data are inserted in the film. Therefore, if it is impossible to modify the date, or if the user photographs without noticing that the date is wrong, photographs with the correct date can be printed by modifying the date later.

Especially, if unmodified date information is inserted in given positions within frames, and if the above-described difference between the two kinds of information and the information indicative of the number of film frames used for photography before the modification are inserted into given positions located outside the exposure regions of the film, then it is possible to calculate the correct date information from the unmodified date information, the difference, and the number of frames before a printing operation is carried out. That is, when the printing operation is effected, the correct date may be calculated manually and then a printing operation may be performed. Furthermore, the correct date may be automatically printed by providing a reading means for reading unmodified date information, the difference, and the number of flames from the film, a processing means for calculating the number of flames from information read by the reading means, and a printing means for printing the results of the calculation performed by the processing means.

If only date information is inserted into given locations within the frames provided that the date information is not modified, or if the above-described difference is inserted into the given positions within the frames in addition to the date information provided that the date information has been modified, then a further advantage is obtained, as well as the advantages produced by inserting the difference and the number of frames into given positions outside the exposure regions of the film. That is, it is unlikely that the given positions located outside the exposure regions are exposed to light so that inserted information such as the difference and the number of frames are lost all at once.

If the above-described difference between the two kinds of date information is added to the date information obtained on photography and inserted into the given positions within the frames, then the correct date can be printed without performing any special operation.

What is claimed is:

1. An apparatus for optically or magnetically inserting date information into given positions located outside exposure regions of a film loaded in a camera, said apparatus comprising:

a date information modification means for making a modification to said date information;

a first storage means for storing unmodified date information;

a second storage means for storing modified date information obtained by making a modification to said date information;

a third storage means for storing a difference between the date information stored in said first storage means and the date information stored in said second storage means;

a fourth storage means for storing information indicative of the number of frames of the film used for photography before said modification; and a date information insertion means for inserting the information stored in said first storage means into given positions located in the frames and for inserting the information stored in the third and fourth storage means into other given positions located outside the exposure regions of said film.

2. An apparatus for optically or magnetically inserting date information into given positions located outside exposure regions of a film loaded in a camera, said apparatus comprising:

a date information modification means for making a modification to said date information;

a first storage means for storing unmodified date information;

a second storage means for storing modified date information obtained by making a modification to said date information;

a third storage means for storing a difference between the date information stored in said first storage means and the date information stored in said second storage means;

a fourth storage means for storing an information indicative of the number of frames of the film used for photography before said modification; and a date information insertion means which, when the date information is not modified, inserts only said unmodified date information into the given locations of the frame and which, when the date information has been modified, inserts the information stored in said third storage means into said given locations in addition to said date information.

3. An apparatus for optically or magnetically inserting date information into given positions within a film loaded in a camera, said apparatus comprising:

a date modification means for modifying said date information;

a first storage means for storing date information of each frames of said film obtained when respect frames are used for photography;

a second storage means for storing modified date information;

a third storage means for storing a difference between the date information stored in said first storage means and the date information stored in said second storage means;

an arithmetic means for adding said difference stored in said third storage means to the date information stored in said first storage means; and a date information insertion means for inserting the date information stored in said first storage means into given positions within said frames.

* * * * *